UNITED STATES PATENT OFFICE.

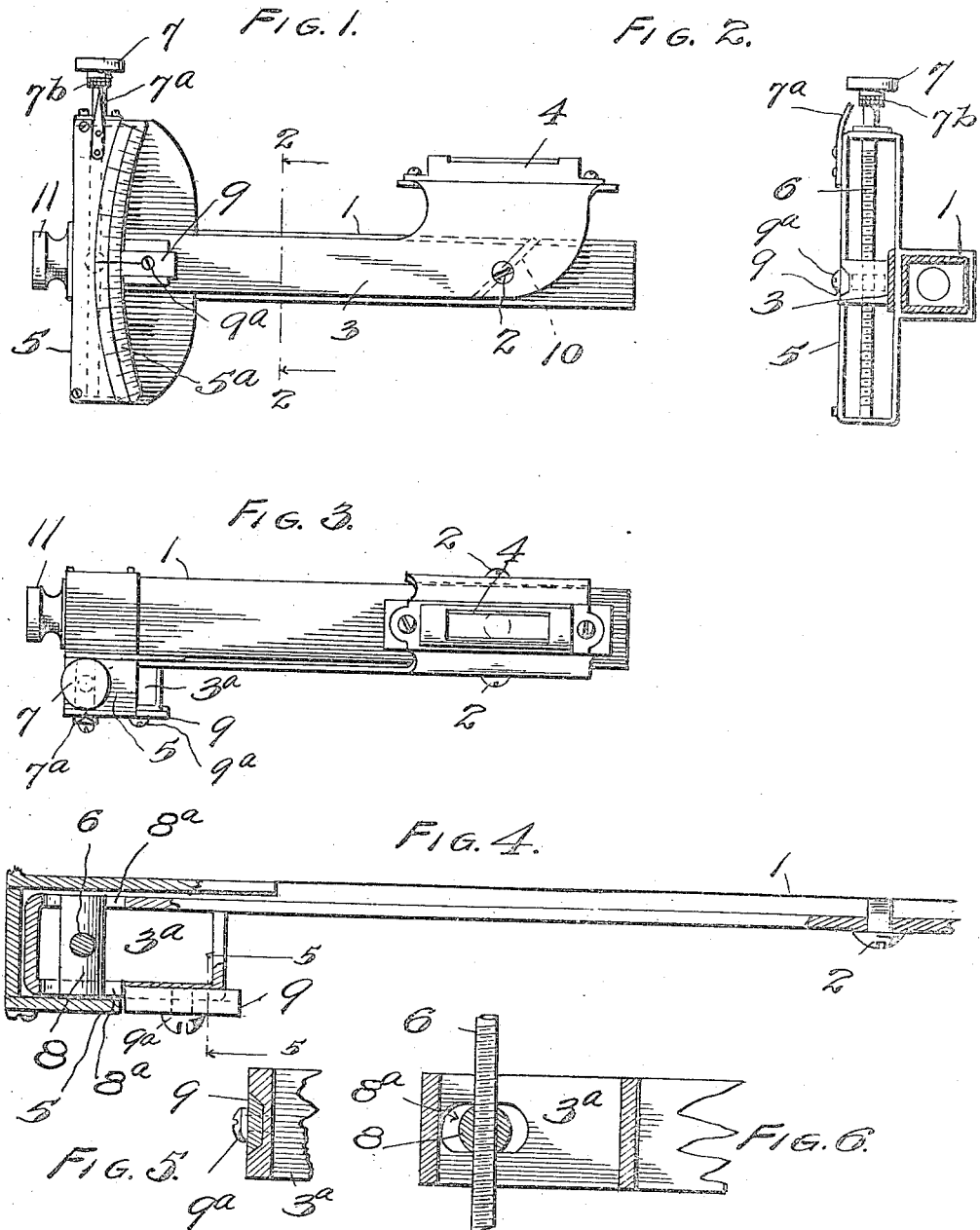

WILLIAM STUART FALLIS, OF RALEIGH, NORTH CAROLINA.

HAND-LEVEL.

1,253,163. Specification of Letters Patent. Patented Jan. 8, 1918.

Application filed March 20, 1916. Serial No. 85,352.

*To all whom it may concern:*

Be it known that I, WILLIAM S. FALLIS, a citizen of the United States, residing at Raleigh, in the county of Wake and State of North Carolina, have invented new and useful Improvements in Hand-Levels, of which the following is a specification.

My invention relates to improvements in hand levels, and more particularly to that type of instrument generally known as the Abney or Locke level.

The object of my invention is to overcome certain disadvantages common to the devices of this character in present use, by providing a practical level which will be compact and handy, simple in construction, inexpensive to manufacture, and capable of speedy, accurate, and positive adjustment in actual use.

The construction by which I obtain these results will be hereinafter described in detail in connection with the accompanying drawing in which like reference characters denote like parts in the several views.

Broadly speaking, my invention comprises, in combination with the aforesaid Locke type of hand level, an indicator-arm pivoted to the sighting device, a spirit level mounted on said arm, a measurement scale secured to the sighting device, and a positive adjusting means for the indicator-arm.

To lock the Abney instrument, after the percentage or degree of an ascending or a descending grade of a given point or object is obtained through the sight, it is necessary to manipulate a clamping device which is both awkward and difficult while the object is in view through the sight. The readings may consequently prove inaccurate unless the instrument is handled with extreme care entailing considerable loss of time.

In the accompanying drawing, Figure 1 is a side elevation of the complete instrument; Fig. 2 a view on line 2—2 of Fig. 1; Fig. 3 a top plan view; Fig. 4 an enlarged top view with portions broken away to show the adjusting mechanism and the pivoted end of the indicator-arm; Fig. 5 an enlarged detail of member 9; and Fig. 6 an enlarged detail of the screw-bar arrangement.

Referring to the drawings in detail, the numeral 1 indicates the sighting device to which is pivoted at 2 the indicator-arm 3. Mounted upon the latter directly above the pivotal point is the spirit level 4. Secured to the said device 1 is the casing 5 having thereon the scale 5ª, while mounted in said casing as shown is the adjusting screw-bar 6 having the head 7, which screw-bar operates in connection with the movable nut 8 to swing the indicator-arm 3. For the purpose of indicating the percentage or degree on the said scale the rectangular frame portion 3ª of the said arm has secured thereto by the screw 9ª the indicator plate 9. By turning the screw-bar in one direction the percentage or degree of an ascending grade is registered on the scale while to register the percentage or degree of a descending grade the screw-bar is turned in the opposite direction.

In Figs. 1 and 2 is shown an additional scale indicating means by which the operator is enabled to register the degrees of grade with the utmost fineness and accuracy. This consists of the finger 7ª attached to the casing 5 and a double scale 7ᵇ on the screw-bar 6, the latter being designed to read from zero in each direction. This gives a micrometer adjustment by reason of the co-ordination of the thread on the screw-bar with the scale 5ª, a matter of proper mathematical computation.

The spirit level 4 is disposed in the well known manner shown, above an opening in the sighting device 1 within which and below the said opening is the usual mirror 10 common to such instruments. At one end of the sighting device is the eye-piece 11.

The peculiar and novel construction whereby I secure the aforementioned adjustment of the indicator-arm is to be especially noted. In Figs. 4 and 6 it will be seen that the free end of the arm doubles back and forms a rectangular frame 3ª having slots 8ª in the walls thereof in which is mounted the said movable nut 8 through which passes the adjusting screw-bar 6, thus providing a very simple effective construction of few parts not likely to become loose or out of adjustment.

From the foregoing construction and arrangement of parts it is obvious that a given point having been sighted through the sighting device the screw-member may be readily and easily operated in the proper direction until the bubble in the spirit level is reflected in the center of the mirror when the degree or percentage of grade will be indicated or registered on the scales without the instrument having been removed from the line of vision. The screw-bar enables the observer to secure a steady, reliable and accurate adjustment; and due to the fact that the radius of the arm from its pivotal point to the scale on the casing is much greater (being preferably three inches or more) than other instruments of this character, it is unnecessary to employ a vernier in connection with the said scale. Also, the micrometer adjustment already described has been found to be far superior to the vernier in the fineness of gradation that can be secured.

Having described my invention, what I claim as new and desire to secure by Letters Patent of the United States, is:

The combination with a sighting device of an indicator arm pivoted near one end, to the outer end of the sighting device, a spirit level mounted on the arm in position to co-act with the sighting device, a casing attached to the inner end of the sighting device and having a measuring scale thereon, an indicator plate on the arm co-acting with said scale, a screw bar mounted in the casing, and a movable nut supported in the slotted free end of the arm within said casing, for the purpose described.

WILLIAM STUART FALLIS.

Witnesses:
W. McC. WHITE,
D. E. MACCARTHY.

Copies of this patent may be obtained for five cents each, by addressing the "Commissioner of Patents, Washington, D. C."